United States Patent [19]

Echigo et al.

[11] Patent Number: 4,640,971

[45] Date of Patent: Feb. 3, 1987

[54] MICROSPHERICAL PARTICLES OF RESOLE RESINS AND PROCESS FOR PRODUCING THE SAME

[75] Inventors: Yoshiaki Echigo; Mutsunori Yamao; Yoshiyuki Suematu; Tadashi Ishikura; Keiichi Asami; Ritsuko Shidei, all of Kyoto, Japan

[73] Assignee: Unitika Ltd., Hyogo, Japan

[21] Appl. No.: 755,769

[22] Filed: Jul. 17, 1985

[30] Foreign Application Priority Data

Jul. 17, 1984 [JP] Japan .............................. 59-150399
Nov. 26, 1984 [JP] Japan .............................. 59-249086

[51] Int. Cl.$^4$ .................. C08G 8/10; C08G 14/06; C08G 14/08
[52] U.S. Cl. .................................. 528/129; 528/146; 528/165; 528/151; 524/401; 524/414; 524/509
[58] Field of Search .............. 528/129, 146, 165, 151; 524/401, 414, 509

[56] References Cited

U.S. PATENT DOCUMENTS 4,454,298  6/1984  Koyama et al. .................... 528/129

Primary Examiner—John Kight
Assistant Examiner—M. L. Moore
Attorney, Agent, or Firm—Sughrue, Mion, Zinn, Macpeak & Seas

[57] ABSTRACT

A resole resin in the form of microspherical particles whose surfaces are partly or entirely covered with a coating of a substantially water-insoluble inorganic salt and which are not larger than 500 μm in size, and a process for producing such resole resin. The resole resin comprises solid particles that are highly heat reactive and can be stored in a stable manner for a prolonged period. The resin particles can be used with good results in all fields of applications (e.g., moldings, laminations and binders) where conventional phenolic resins are used.

4 Claims, 2 Drawing Figures

FIG. 1 (×300)
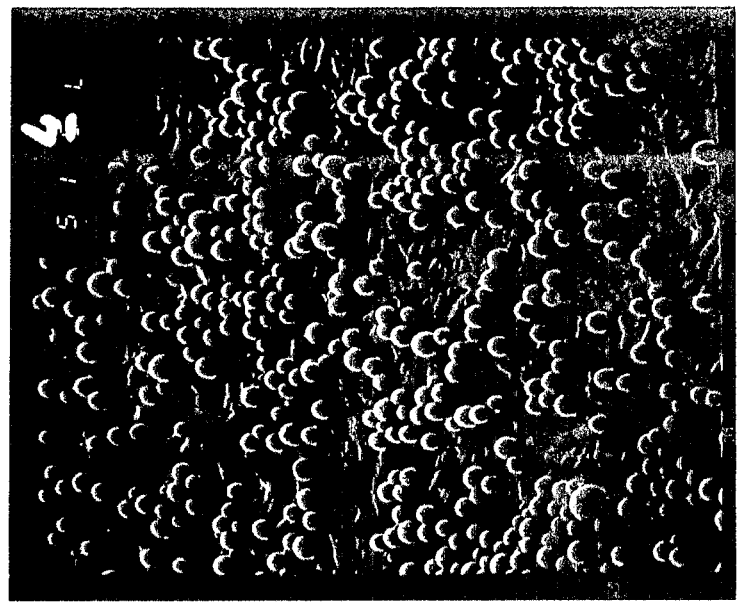
FIG. 2 (×3,000)
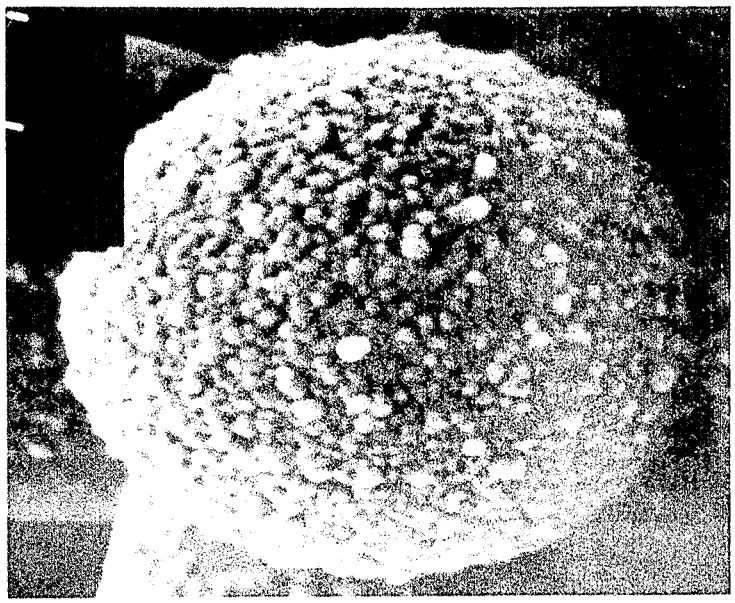

MICROSPHERICAL PARTICLES OF RESOLE RESINS AND PROCESS FOR PRODUCING THE SAME

FIELD OF THE INVENTION

The present invention relates to solid resole resins in the form of microspherical particles which are heat reactive and which have long term stability. The invention also relates to a process for producing such resole resins.

BACKGROUND OF THE INVENTION

Resole resins, commonly referred to as one-step phenolic resins, are generally produced by polycondensing phenols such as phenol and cresol with aldehydes such as formaldehyde and acetaldehyde in the presence of basic catalysts such as aqueous ammonia, organic amines or sodium hydroxide.

The production of novolak resins, referred to as two-step phenolic resins, is generally accompanied by thermosetting with the aid of a cross-linking agent such as hexamethylenetetramine. On the other hand, resole resins having a high methylol group content in the molecule are inherently thermosetting and can be directly cured. Because of their extremely high reactivity, resole resins are usually manufactured as aqueous or methanol solutions with a solids content ranging from about 50 to 60 wt% and are stored as such. Recovery of resole resins in a stable particulate or powder form is generally considered to be difficult.

Various approaches have been disclosed to produce resole resins in a stable solid form. For example, U.S. Pat. Nos. 3,823,103, 4,026,828, 4,039,525 and 4,206,095 disclose the production of particulate resole resins by emulsion polymerizing phenols and formaldehyde in the presence of both a basic catalyst (e.g., ammonia) and a protective colloid such as gum arabic (U.S. Pat. No. 3,823,103), gum ghatti (U.S. Pat. No. 4,026,828) or hydroxyalkylated guar (U.S. Pat. No. 4,039,525). The characteristics of the resole resins prepared by these methods and the possible applications in which such resins can be used are reported in G. L. Brode, T. R. Jones, S. W. Chow, *CHEMTECH,* November, 676–681 (1983), A. M. Regina-Mazzuca, W. F. Ark and T. R. Jones, *Ind. Eng. Chem. Prod. Res. Dev.,* 21, 139 to 141 (1982) and G. L. Brode, P. W. Kopf and S. W. Chow, *Ind. Eng. Chem. Prod. Res. Dev.,* 21, 142–145 (1982).

Japanese Patent Publication No. 42077/78 discloses a process wherein a phenol is condensed with formaldehyde using a basic catalyst in the presence of a nitrogen-containing compound such as ethylenediamine, and to the resulting condensate, a hydrophilic organic polymer such as gelatin, casein or poly(vinyl alcohol) is added to further continue the reaction so as to produce a resole resin in either a particulate or powder form.

Japanese Patent Application (OPI) No. 88995/79 (corresponding to U.S. Pat. No. 4,182,696) (the term "OPI" as used herein refers to a "published unexamined Japanese patent application") describes a process for producing a resole resin by reacting a mixture of formaldehyde, phenol and an amine compound such as hexamethylenetetramine in an aqueous medium with a filler having a reactive group capable of chemically bonding to a phenolic resin in the presence of a protective colloid.

In each of the prior art methods described above, a hydrophilic organic polymer compound is used as an emulsion stabilizer and the resulting resole resin inevitably contains such a hydrophilic compound. Therefore, moldings of such resin have relatively poor properties in terms of, for example, resistance to heat and moisture. Furthermore, the resin particles have a tendency to sinter either during drying or during storage.

In order to solve these problems, Japanese Patent Application (OPI) No. 177011/82 (corresponding to U.S. Pat. No. 4,414,378) discloses a method of producing a solid, thermosetting phenolic resin as fine particles by reacting a phenol with a molar excess of formaldehyde (8 to 10 mols per phenol) in the presence of an acid catalyst. However, the resole produced by this method not only cures slowly but also has so poor flow characteristics that its molding properties are impractically low.

As a final problem, the flame retardancy of phenolic resins is relatively low and needs further improvement.

SUMMARY OF THE INVENTION

One object, therefore, of the present invention is to provide a resole resin in the form of microspherical particles of a size not greater than about 500 $\mu$m, as well as a process for producing such a resin.

Another object of the present invention is to provide a resole resin in the form of microspherical particles having satisfactory long term stability, as well as a process for producing such a resin.

Still another object of the present invention is to provide a resole resin in the form of microspherical particles having good flow characteristics, high heat reactivity and good molding properties, as well as a process for producing such a resin.

A further object of the present invention is to provide a resole resin in a microspherical form from which a molding can be obtained without causing a decrease in properties such as resistance to heat and moisture, as well as a process for producing such a resin.

A still further object of the present invention is to provide a resole resin in the form of microspherical particles having good flame retardancy, as well as a process for producing the same.

As a result of various studies made in order to achieve the objects described above, it has now been found that phenols and aldehydes can be emulsion-polymerized in the presence of a basic catalyst in an extremely highly stable manner by incorporating a substantially water-insoluble inorganic salt with a water solubility not greater than about 0.2 g/1,000 ml at 25° C. in the reaction system.

It has also been found that the resole resin obtained by this method is in the form of solid microspherical particles and has good properties such as satisfactory long term stability.

In accordance with one aspect of the present invention, there is provided a resole resin in the form of microspherical particles whose surfaces are partly or entirely covered with a substantially water-insoluble inorganic salt with a water solubility not greater than about 0.2 g/1,000 ml at 25° C. and which have particle sizes not larger than about 500 $\mu$m.

In accordance with another aspect of the present invention, a process for producing such a resin is provided which comprises reacting a phenol with an aldehyde in an aqueous medium in the presence of both a basic catalyst and a substantially water-insoluble inorganic salt with a water solubility not greater than about 0.2 g/1,000 ml at 25° C.

BRIEF DESCRIPTION OF THE DRAWINGS

FIGS. 1 and 2 are scanning electron micrographs at magnifications of 300 (FIG. 1) and 3,000 (FIG. 2) showing a resole resin obtained as microspherical particles by using calcium fluoride as a typical example of the substantially water-insoluble inorganic salt in accordance with the present invention.

DETAILED DESCRIPTION OF THE INVENTION

The microspherical particles of resole resin in accordance with one aspect of the present invention are covered with a substantially water-insoluble inorganic salt. Details of such microspherical particles are given below.

The substantially water-insoluble inorganic salt as used in the present invention is one having a water solubility not greater than about 0.2 g/1,000 ml at 25° C. Illustrative inorganic salts having this characteristic are calcium fluoride, magnesium fluoride and strontium fluoride, and calcium fluoride is particularly preferred.

As shown in FIG. 1, the resole resin prepared in accordance with the present invention using calcium fluoride as the substantially water-insoluble inorganic salt comprises generally spherical particles with particle sizes not greater than about 500 μm and a very narrow particle size distribution. As shown in FIG. 2, the surfaces of the individual resin particles are covered with extremely fine calcium fluoride particles.

As will be shown hereinafter, the coating of the substantially water-insoluble inorganic salt on the surfaces of the resole resin is formed by reacting a phenol and an aldehyde in the presence of both a basic catalyst and the inorganic salt with the above described characteristic. The coating weight can be appropriately controlled by adjusting the amount of the inorganic salt present in the reaction system.

As already mentioned with reference to FIG. 1, the particles of resole resin having the coating of the substantially water-insoluble inorganic salt are in the form of microspheres with particle sizes (individual particle size maximum) not greater than about 500 μm. Unlike conventional powdered or particulate resole resins, the resole resin prepared in accordance with the present invention comprises microspheres that are not sintered either during the drying step of manufacture or during subsequent storage probably because of the coating of the substantially water-insoluble inorganic salt formed on the resin particles during manufacture.

Illustrative flame retardants that can be used in the present invention to provide resole resins having flame retardancy include phosphorus compounds such as red phosphorus, yellow phosphorus and triphenyl phosphate, and halogen compounds such as decabromodiphenyl ether and hexabromobenzene, with red phosphorus being particularly preferred. As will be shown hereinafter, when a phenol is reacted with an aldehyde in an aqueous medium in the presence of a basic catalyst using both the substantially water-insoluble inorganic salt and the flame retardant in accordance with the present invention, a coating of the flame retardant is deposited on the particles of the resulting resole resin. The weight of the flame retardant coating can be appropriately controlled by adjusting the amount of the flame retardant present in the reaction system. Even if a flame retardant is used, the resulting resole resin comprises microspherical particles that are not larger than about 500 μm in size and which are not sintered either during the drying step of manufacture or during subsequent storage.

The particles of the resole resin prepared in accordance with the present invention have a coating of the substantially water-insoluble inorganic salt, so they can be stored for a period of one year or longer without sintering. Furthermore, the resole resins comprising microspheres not larger than about 500 μm in size provide greater ease of handling in molding and other applications of the resin.

Another aspect of the present invention concerns a process for producing the above described resole resin as microspherical particles.

Basically, the process comprises reacting a phenol with an aldehyde in an aqueous medium in the presence of both a basic catalyst and the substantially water-insoluble inorganic salt. The phenol as a reactant can be phenol and derivatives thereof. Illustrative phenol derivatives include m-alkyl substituted phenols, o-alkyl substituted phenols and p-alkyl substituted phenols where the alkyl group has 1 to 9 carbon atoms, such as m-cresol, p-tert-butylphenol, o-propylphenol, resorcinol and bisphenol A, as well as halophenol wherein part or all of the hydrogens on the benzene nucleus or in the alkyl group in phenol derivatives are substituted with chlorine or bromine. The more preferred phenols are phenol, m-cresol, bisphenol A, chlorophenol and bromophenol. The phenols described above may be used either alone or in admixtures. Phenols that can be used as the reactant with aldehydes are not limited to the examples given above and any compound that contains a phenolic hydroxyl group may be used.

Examples of aldehydes that can be used in the present invention include formaldehydes in the form of either formalin or paraformaldehyde, furfural, and furfuryl alcohol. The molar ratio of aldehyde to phenol ranges from about 1:1 to 2:1, preferably from 1.1:1 to 1.4:1, more preferably from 1.1:1 to 1.2:1.

The basic catalyst used in the process of the present invention may be selected from among any basic catalysts that are conventionally used in the manufacture of resole resins. Illustrative basic catalysts include aqueous ammonia, hexamethylenetetramine, and alkylamines such as dimethylamine, diethylenetriamine and polyethyleneimine. The molar ratio of basic catalyst to phenol ranges generally from about 0.01:1 to 0.5:1, preferably from 0.02:1 to 0.2:1.

As already mentioned in connection with the first aspect of the present invention, calcium fluoride, magnesium fluoride and strontium fluoride are preferably used as the substantially water-insoluble inorganic salt that is incorporated in the reaction system of the phenols and aldehydes in the presence of basic catalysts. Such inorganic salts are used in amounts ranging from about 0.2 to about 10%, preferably from 0.5 to 3.5%, more preferably from 1.0 to 2.5%, by weight to the weight of the phenol. The substantially water-insoluble inorganic salts may be directly added to the reaction system before the reaction for the production of resole resin is started. Alternatively, two or more water-soluble inorganic salts that will yield the substantially water-insoluble inorganic salt in situ may be added to the reaction before the reaction is started. For example, in place of the water-insoluble fluoride of calcium, magnesium or strontium, at least one water-soluble inorganic compound selected from the group consisting of sodium fluoride, potassium fluoride and ammonium fluoride and at least one other compound selected from the group consisting of calcium chloride, calcium sulfate, calcium nitrate, magnesium chloride, magnesium sulfate, magnesium nitrate, strontium chloride, strontium sulfate and strontium nitrate are added to the reaction system so as to produce calcium fluoride, magnesium fluoride or strontium fluoride during the reaction for the production of the resole resin.

If flame retardants are used in the process of the present invention, phenols are reacted with aldehydes in an aqueous medium in the presence of both the flame retardant and the substantially water-insoluble inorganic salt. Flame retardants are used in amounts generally ranging from about 0.1 to about 30%, preferably from 2 to 10%, more preferably from 3 to 5%, by weight to the weight of the phenol.

The reaction involved in the process of the present invention is carried out in an aqueous medium and the amount of water employed is such that the solids content of the resulting resole resin ranges generally from about 30 to about 70 wt%, preferably from 50 to 60 wt%.

The reaction is performed under agitation as the temperature of the reaction system is gradually elevated at a rate of from about 0.5° to about 1.5° C./min, preferably from 0.8° to 1.2° C./min, and the reaction continues at a temperature between about 70° and about 90° C., preferably between 83° and 87° C., for a period ranging from about 20 to about 150 minutes, preferably from 40 to 110 minutes. Thereafter, the reaction mixture is cooled to about 40° C. or below, yielding a stable aqueous emulsion of solid resole resin.

The aqueous emulsion can be subjected to any of the conventional solid-liquid separating techniques such as filtration and centrifugation. The separated solid is washed and dried to obtain a resole resin as solid microspherical particles which, in accordance with the present invention, are covered with the coating of the substantially water-insoluble inorganic salt and which are not larger than about 500 μm in size.

The process of the present invention may be implemented either as a continuous or batch system, the latter being more common.

The particles of resole resin produced in accordance with the process of the present invention are dry and free-flowing solid microspheres which are not sintered during subsequent storage. As already mentioned in connection with the description of the first aspect of this invention, these particles are highly stable and exhibit good flow and molding properties. Additionally, the microspherical resole resin particles in accordance with the present invention have high reactivity and will gel fast to permit rapid molding. Moldings prepared from such particles have good quality and exhibit high performance.

Resole resin particles with a red phosphorus coating have a particularly high degree of flame retardancy.

The microspherical particles of resole resin produced by the process of the present invention are not larger than about 500 μm in size, and the greater part of them have a maximum size of 100 μm, thus exhibiting a very narrow size distribution as compared with the particulate resole resins produced in the prior art. This fact alone suggests the great effectiveness of the process of the present invention in producing a stable emulsion of resole resin.

The resole resin in the form of microspherical particles prepared in accordance with the present invention is typically used as a moldable solid resole resin. If desired, the aqueous emulsion of solid resole as obtained by reaction between phenol and aldehyde in the presence of both a basic catalyst and the substantially water-insoluble inorganic salt may be immediately used as an adhesive. The particulate resole resin in accordance with the present invention is usable in laminations, as binders and in other fields of application where conventional phenolic resins are employed.

The resole resin particles obtained by the process of the present invention may be used after addition of various additives depending upon specific needs. Illustrative additives include thermoplastic resins such as polyolefins (e.g., polyethylene, polypropylene, polystyrene, acrylonitrile-styrene copolymer, acrylonitrile-butadiene-styrene terpolymer, polyvinyl formal and poly(methyl methacrylate)), polyamides (e.g., polycapramide and polyhexamethylene adipamide), polyesters, (e.g., polybutylene terephthalate, polyethylene terephthalate, polycarbonate and polyarylate), as well as polysulfone, polyacetal and polyphenylene sulfide; thermosetting resins such as melamine resins, silicone resins, urea resins, unsaturated polyesters, epoxy resins, alkyd resins and phenolic resins; reinforcing agents such as fiber glass, carbon fibers and metal fibers; inorganic or organic fillers such as talc, wood and paper; pigments or dyes such as titanium oxide and iron oxides; as well as foaming agents, stabilizers, flame retardants, lubricants and dispersants. These additives may be used either alone or in admixtures.

The following Examples are provided to further illustrate the present invention but the present invention is not to be construed as being limited to these Examples. Unless otherwise indicated herein, all parts, percents, ratios and the like are by weight.

EXAMPLES 1 TO 4 AND COMPARATIVE EXAMPLE 1

A three-necked flask (capacity: 3,000 ml) was charged with 700 g of phenol, 700 g of 37 wt% aq. solution of formaldehyde, 420 g of water, 63 g of hexamethylenetetramine and 29.4 g of calcium chloride. The contents were agitated to form a uniform solution. To the stirred solution, 20.3 g of potassium fluoride was added, and the mixture was heated to 85° C. over a period of 60 minutes, followed by agitation at that temperature. The contents of the flask became turbid in 5 minutes to form an emulsion of resole resin. Fifty minutes later, a 300 ml sample was taken from the emulsion and poured into 1,000 ml of water for cooling. The supernatant was decanted and the microspheres of resin recovered from the lower layer were washed with water and dried with air. The particles were further dried by heating for 24 hours at between 50° and 60° C. and a reduced pressure of 5 mmHg or below, yielding a resole resin as microspherical particles with an average size of 50 μm. Samples (300 ml) were also taken from the emulsion 60 minutes, 80 minutes, 120 minutes and 150 minutes after the contents of the flask began to become turbid, and subjected to the same treatments as described above.

The results of measurement of the gel time and flow characteristics of each of the five samples are shown in Table 1 below.

TABLE 1

| Run No. | Reaction Time (min) | Gel Time[a] (sec) | Flow Characteristics[b] (mm) |
| --- | --- | --- | --- |
| Example 1 | 50 | 105 | 85 |
| Example 2 | 60 | 78 | 58 |
| Example 3 | 80 | 45 | 20 |
| Example 4 | 120 | 5 | 7 |
| Comparative Example 1 | 150 | 0 | 0 |

[a] As measured by the method specified in JIS K-6909.
[b] As measured by the method specified in JIS K-6910.

The sample prepared in Comparative Example 1 was heat-infusible whereas those prepared in Examples 1 to 4 were heat-fusible. The resin particles of the sample prepared in Example 3 were examined under a scanning electron microscope and the results were similar to those shown in FIG. 1 (particle shape, ×300) and FIG. 2 (surface state, ×3,000). The observed particles had a particle size distribution such that at least 80 wt% of the particles were between 55 and 65 μm in size. Data for the long term stability of the resole resin particles prepared in Example 3 are shown in Table 2. A molding was press-formed from these resin particles at a mold temperature of 160° C. by applying a pressure of 150 kg/cm² for 10 minutes. The molding had the physical data shown in Table 3 below.

TABLE 2

| As Dried | | After 60 Day Storage at 40° C. and 60% R.H. | |
| --- | --- | --- | --- |
| Gel Time (sec) | Flow Characteristics (mm) | Gel Time (sec) | Flow Characteristics (mm) |
| 45 | 20 | 42 | 19 |
| Dry, free-flowing microspheres (no sintering) | | Dry, free-flowing microspheres (no sintering) | |

TABLE 3

| Heat Deflection Temperature* (°C.) | Water Absorption after Boiling** (wt %) | Rockwell Hardness*** |
| --- | --- | --- |
| 160 | 0.3 | 127 |

*As measured by the method specified in ASTM D-648 (load: 18.5 kg/cm²)
**As measured after boiling in water for 2 hours (JIS K 6911)
***M scale (ASTM D-785)

As the above data show, the resole resin particles prepared in Example 3 not only exhibited good storage quality and the molding formed from such particles had excellent physical properties.

EXAMPLE 5

A three-necked flask (capacity: 1,000 ml) was charged with 200 g of phenol, 200 g of 37 wt% aq. solution of formaldehyde, 70 g of water, 18 g of hexamethylenetetramine and 8.4 g of calcium chloride. The contents were agitated to form a uniform solution. To the stirred solution, 5.8 g of potassium fluoride was added, and the mixture was heated to 85° C. over a period of 30 minutes. Thereafter, 6 g of red phosphorus powder (200 mesh pass) was added and the reaction was continued for another 60 minutes, yielding an emulsion of resole resin.

The contents of the flask were cooled to 30° C. and 500 ml of water was added. The supernatant was decanted and the microspheres of resin recovered from the lower layer were washed with water and dried with air. The particles were further dried by heating for 24 hours at between 50° and 60° C. and a reduced pressure of 5 mmHg or below, yielding a resole resin as microspherical particles with an average particle size of 50 μm.

The resin particles were inspected under a scanning electron microscope and the results were similar to those shown in FIG. 1 (particle shape) and FIG. 2 (surface state). The relative amount of the coating of red phosphorus on the resin particles was 2.7 wt%.

EXAMPLE 6

The procedures of Example 5 were repeated except that the amount of red phosphorus was reduced to 3 g and 5.8 g of potassium fluoride was replaced by an equal amount of sodium fluoride. A resole resin was obtained as microspherical particles with an average size of 100 μm. The particles were examined under a scanning electron microscope and the results were similar to those shown in FIG. 1 (particle shape) and FIG. 2 (surface state). The relative amount of the coating of red phosphorus on the resin particles was 1.3 wt%.

The characteristics of the resole resins prepared in Examples 3, 5 and 6 are summarized in Table 4 below.

TABLE 4

| Resin Sample | Gel Time (sec) | Flow Characteristics (mm) | Burning Characteristics* |
| --- | --- | --- | --- |
| Example 5 | 55 | 23 | V-0 |
| Example 6 | 52 | 22 | V-0 |
| Example 3 | 45 | 20 | V-1 |

*A sample was press-formed at a mold (127 × 12.7 × 3.2 mm) temperature of 160° C. by applying a pressure of 150 kg/cm² for 10 minutes, and later subjected to a burning test in accordance with UL-94.

As the results in Table 4 show, red phosphorus was effective in improving the flame retardancy of resole resins without causing any adverse effects on other characteristics of the resins.

EXAMPLE 7

A three-necked flask (capacity: 1,000 ml) was charged with 100 g of phenol, 100 g of 37 wt% aq. solution of formaldehyde, 60 g of water, 15 g of 30 wt% NH₄OH and 4.2 g of calcium chloride. The contents were agitated to form a uniform solution. To the stirred solution, 2.9 g of potassium fluoride was added and the mixture was heated to 85° C. over a period of 60 minutes. Thereafter, the reaction was conducted at 85° C. for another 80 minutes. The reaction mixture was subsequently treated as in Example 5, yielding a resole resin of microspherical particles with an average particle size of 50 μm. The resin had a gel time of 50 seconds and flow characteristics of 21 mm.

The resin particles were examined under a scanning electron microscope and the results were similar to those shown in FIG. 1 (particle shape) and FIG. 2 (surface state). It was therefore clear that aqueous ammonia was as effective as hexamethylenetetramine in attaining the objects of the present invention.

EXAMPLES 8 TO 11

A three-necked flask (capacity: 1,000 ml) was charged with varying amounts of phenol (see Table 5 below), 100 g of 37 wt% aq. solution of formaldehyde, 9 g of hexamethylenetetramine, 4.2 g of calcium chloride and 2.9 g of potassium fluoride. During charging, the contents were agitated. The mixture was heated to 85° C. over a period of 60 minutes. Thereafter, the reaction was conducted at 85° C. for another 80 minutes. The reaction mixture was subsequently treated as in Example 5, yielding resole resins of microspherical particles. The average particle size of each resin and its characteristics are shown in Table 5 below.

TABLE 5

| Run No. | Phenols Name | Amount (g) | Gel Time (sec) | Flow Characteristics (mm) | Average Size (μm) |
|---|---|---|---|---|---|
| Example 8 | Bisphenol A | 250 | 93 | 27 | 70 |
| Example 9 | Bisphenol A/p-t-butyl phenol | 160/60 | 185 | 30 | 80 |
| Example 10 | Phenol/p-t-butyl phenol | 95/5 | 85 | 25 | 60 |
| Example 11 | Phenol/o-cresol | 90/10 | 78 | 24 | 70 |

The results of SEM observation of each of the samples were similar to those shown in FIGS. 1 and 2.

EXAMPLE 12

A three-necked flask (capacity: 1,000 ml) was charged with 100 g of phenol, 40 g of paraformaldehyde, 9 g of hexamethylenetetramine, 4.2 g of calcium chloride and 2.9 g of potassium fluoride. During charging, the contents were agitated. The mixture was heated to 85° C. over a period of 60 minutes. Thereafter, the reaction was conducted at 85° C. for another 80 minutes. The reaction mixture was subsequently treated as in Example 5, yielding a resole resin of microspherical particles with an average particle size of about 80 μm. The resin had a gel time of 47 seconds and flow characteristics of 23 mm.

The particles obtained had a particle size distribution such that at least 85 wt% of the particles were between 72 and 88 μm in size. The results of SEM observation of the particles were very close to those shown in FIGS. 1 and 2.

It was therefore clear that resole resins of entirely the same characteristics could be obtained whether the aldehyde used was formaldehyde or paraformaldehyde.

EXAMPLE 13

A three-necked flask (capacity: 1,000 ml) was charged with 200 g of phenol, 200 g of 37 wt% aq. solution of formaldehyde, 70 g of water, 18 g of hexamethylenetetramine, and 7.2 g of magnesium chloride. The contents were agitated to form a uniform solution. To the stirred solution, 5.8 g of potassium fluoride was added, and the mixture was heated to 85° C. over a period of 60 minutes, followed by conducting the reaction at 85° C. for an additional 80 minutes to obtain an emulsion of a resole resin.

The contents of the flask were cooled to 30° C. and 500 ml of water was added. The supernatant was decanted and the microspheres of resin recovered from the lower layer were washed with water and dried with air. The particles were further dried by heating for 24 hours at between 50° and 60° C. and a reduced pressure of 5 mmHg, yielding a resole resin as microspherical particles with an average particle size of about 200 μm. The resin had a gel time of 50 seconds and flow characteristics of 22 mm.

The results of SEM observation of the particles were similar to those shown in FIG. 1 (particle shape) and FIG. 2 (surface state).

EXAMPLE 14

A three-necked flask (capacity: 1,000 ml) was charged with 200 g of phenol, 200 g of 37 wt% aq. solution of formaldehyde, 70 g of water, 18 g of hexamethylenetetramine, and 12.0 g of strontium chloride. The contents were agitated to form a uniform solution. To the stirred solution, 5.8 g of potassium fluoride was added, and the mixture was heated to 85° C. over a period of 60 minutes, followed by conducting the reaction at 85° C. for an additional 80 minutes to obtain an emulsion of a resole resin.

The contents of the flask were cooled to 30° C. and 500 ml of water was added. The supernatant was decanted and the microspheres of resin recovered from the lower layer were washed with water and dried with air. The particles were further dried by heating for 24 hours at between 50° and 60° C. and a reduced pressure of 5 mmHg, yielding a resole resin as microspherical particles with an average particle size of about 200 μm. The resin had a gel time of 50 seconds and flow characteristics of 22 mm.

The results of SEM observation of the particles were similar to those shown in FIG. 1 (particle shape) and FIG. 2 (surface state).

COMPARATIVE EXAMPLE 2

A particulate resole resin was prepared by the following method based on the description of U.S. Pat. No. 4,039,525.

A three-necked flask (capacity: 1,000 ml) was charged with 100 g of phenol, 90 g of 37 wt% aq. solution of formaldehyde, 9 g of hexamethylenetetramine, 150 g of water and 1 g of gum arabic. The contents were agitated to form a uniform solution. The mixture was heated to 85° C. over a period of 45 minutes, followed by performing the reaction at 85° C. for an additional 80 minutes. The reaction product was subsequently treated as in Example 5. Because of the partial sintering that occurred during vacuum drying, lumps with a diameter of about 5 mm formed. They were crushed into fine particles. SEM observation revealed that the particles had no surface coating of the type shown in FIG. 2.

COMPARATIVE EXAMPLE 3

A phenolic resin in the form of fine microspheres was prepared by the following method based on the description in Japanese Patent Application (OPI) No. 177011/82 (corresponding to U.S. Pat. No. 4,414,378).

A three-necked flask (capacity: 2,000 ml) was charged with 405 g of 37 wt% aq. solution of formaldehyde, 214 g of 35 wt% HCl and 881 g of water. Into the flask was further added 62.5 g of a mixture of phenol (50 g), 37 wt% aq. solution of formaldehyde (8.4 g) and water (4.1 g). The contents of the flask was stirred for 20 seconds and left to stand for 60 minutes. Then, the mixture was heated to 80° C. with occasional agitation over a period of 60 minutes, followed by agitation at 80° C. for another 30 minutes. Thereafter, the reaction mixture was cooled to 30° C., filtered, washed with water and dried to produce a phenolic resin in the form of fine particles with an average particle size of about 30 μm.

The characteristics of the resins prepared in Comparative Examples 2 and 3 are shown in Table 6 below.

TABLE 6

| Sample | Gel Time (sec) | Flow Characteristics (mm) | Remarks |
| --- | --- | --- | --- |
| Comparative Example 2 | 75 | 35 | Sintering occured during the drying step |
| Comparative Example 3 | 0 | 0 | — |

As noted in the column headed "Remarks", part of the resin prepared in Comparative Example 2 sintered during the drying step. The resin prepared in Comparative Example 3 had zero gel time, indicating the absence of flow.

A molding was press-formed from the resin of Comparative Example 2 under the same conditions as described in Example 3 and the physical properties of the molding were measured as in Example 3. The results are shown in Table 7 below.

TABLE 7

| Heat Deflection Temperature (°C.) | Water Absorption after Boiling (wt %) | Rockwell Hardness (M scale) |
| --- | --- | --- |
| 150 | 0.8 | 123 |

Obviously, the molding formed from the resin prepared in Comparative Example 2 did not have properties as good as those of the molding from the resole resin prepared in Example 3 in accordance with the present invention.

While the invention has been described in detail and with reference to specific embodiments thereof, it will be apparent to one skilled in the art that various changes and modifications can be made therein without departing from the spirit and scope thereof.

What is claimed is:

1. A resole resin in the form of microspherical particles where the surfaces of the particles are partly or entirely covered with a coating of a substantially water-insoluble inorganic salt having a solubility in water not greater than about 0.2 g/1,000 ml at 25° C. and where the particles have a particle size not larger than about 500 μm.

2. A resole resin according to claim 1, wherein said substantially water-insoluble inorganic salt is at least one inorganic salt selected from the group consisting of calcium fluoride, magnesium fluoride and strontium fluoride.

3. A resole resin in the form of microspherical particles where the surfaces of the particles are partly or entirely covered with a coating of a substantially water-insoluble inorganic salt having a solubility in water not greater than about 0.2 g/1,000 ml at 25° C. and a flame retardant and where the particles have a particle size not larger than about 500 μm.

4. A resole resin according to claim 3, wherein said substantially water-insoluble inorganic salt is at least one inorganic salt selected from the group consisting of calcium fluoride, magnesium fluoride and strontium fluoride, and wherein the flame retardant is red phosphorus.

* * * * *